Oct. 21, 1941.   G. T. MEYERS   2,259,764
SHEAR STRUCTURE
Original Filed Sept. 15, 1939   3 Sheets-Sheet 1

INVENTOR
George T. Meyers.
BY
Corbett, Mahoney + Miller
ATTORNEYS.

Oct. 21, 1941.    G. T. MEYERS    2,259,764
SHEAR STRUCTURE
Original Filed Sept. 15, 1939    3 Sheets-Sheet 2

INVENTOR.
George T. Meyers.
BY
Corbett, Mahoney & Miller
ATTORNEYS.

Oct. 21, 1941.  G. T. MEYERS  2,259,764
SHEAR STRUCTURE
Original Filed Sept. 15, 1939    3 Sheets-Sheet 3

INVENTOR.
George T. Meyers.
BY
Corbett, Mahoney & Miller
ATTORNEYS.

Patented Oct. 21, 1941

2,259,764

UNITED STATES PATENT OFFICE 2,259,764

SHEAR STRUCTURE

George T. Meyers, Parkersburg, W. Va., assignor to The Meyers Company, Parkersburg, W. Va., a corporation of West Virginia Original application September 15, 1939, Serial No. 295,055. Divided and this application April 25, 1941, Serial No. 390,327

5 Claims. (Cl. 49—14)

My invention relates to a shear structure. It has to do, more particularly, with a shear structure adapted to be associated with apparatus for feeding molten glass in the form of a stream in order to divide the stream into charges of predetermined size.

As is well known, considerable difficulty is encountered in the manufacture of glassware in attempts to eliminate the shear mark from the finished article. This shear mark is caused by the chilling effect of the shears as they cut the stream of glass. Many efforts have been made to overcome the shear marks. These efforts have involved the reheating of the lower end of the stream of glass after a charge has been sheared therefrom. For this purpose, complicated mechanism is required.

One of the objects of my invention is to provide a shear structure which is of such a nature that it will shear the glass without causing shear marks and, therefore, reheating of the lower end of the stream of glass will not be required.

Another object of my invention is to provide a shear structure of the type indicated which is of a very simple nature.

In its preferred form, my invention contemplates the provision of a shear structure which includes a plurality of movable blades adapted to pass through the stream of molten glass. These blades are of a novel shape. They are preferably curved upwardly so that as they cut through the glass they will produce a concave depression in the lower end of the glass stream. The result is that the last portion of the glass to be severed, which is at the center of the stream, is forced upwardly into the stream at the center thereof where the glass is the hottest. Because this portion of the glass is forced back into the hottest portion of the glass it will be reheated and a shear mark caused by the chilling effect of the blades will be eliminated.

This application is a division of my co-pending application Serial No. 295,055, filed September 15, 1939.

The preferred embodiment of my invention is illustrated in the accompanying drawings wherein similar characters of reference designate corresponding parts and wherein.

Figure 1:
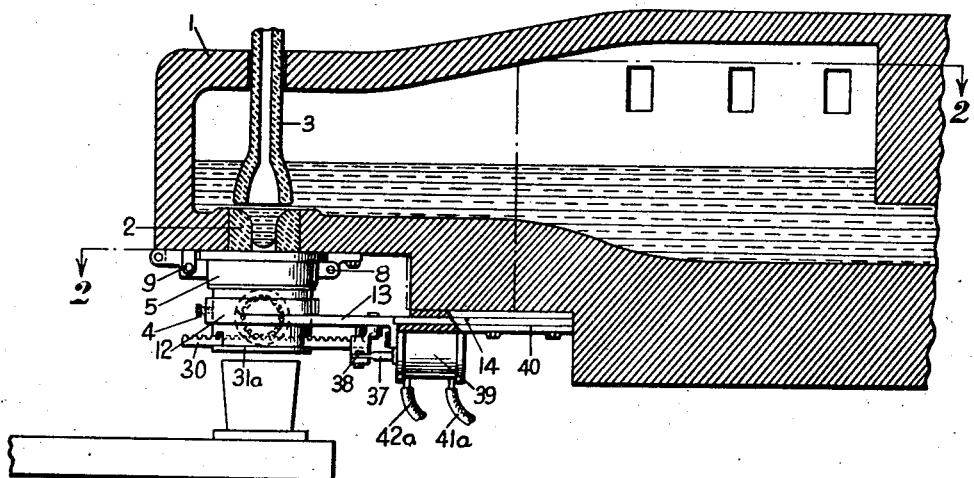
Figure 1 is a longitudinal section taken through a glass feeding spout having my shear structure associated therewith.

With reference to the drawings, I have shown my shear structure in association with glass feeding means of the type disclosed in my Patent No. 2,079,519, issued May 4, 1937. However, it is to be understood that my shear structure may be employed with other types of glass feeders.

In the drawings, I have illustrated a spout having a discharge orifice 2 and means 3 for controlling the flow of glass therethrough. These elements may be the same as the corresponding elements disclosed in my patent. Below the orifice I mount my shear structure which is indicated generally by the numeral 4.

The shear structure includes an upper water jacket portion 5 which is annular form and is disposed directly below the orifice of the spout. It is provided with a central opening 6 (Figures 3 and 4) in which may be disposed a refractory bushing 7. The opening 6 is in alignment with the discharge orifice of the spout. The water jacket portion 5 is hinged at 8 to the lower side of the spout. It is normally held in position by means of a latch 9.

Disposed below the water jacket portion 5 is a tubular housing 10. This housing has its upper end fitting within an annular shoulder 11 formed on the lower surface of the water jacket 5. The member 10 is held in position by a collar member 12 (Figure 1) in which it is clamped. The collar member is carried by an arm 13 which has its outer end slidably mounted in a guide 14. The shear structure may be moved away from the orifice by loosening screws 12a in the collar 12, dropping the housing 10 slightly and then sliding the arm 13 laterally. Then the water jacket portion 5 may be swung away from the orifice if desired.

As illustrated in Figures 3, 4, 5 and 7, the housing 10 has disposed therein a cylindrical member 15. This member 15 has a centrally disposed opening 16 of rectangular form. The member 15 is held within the member 10 by means of screws 17. Within the opening 16, cup-shaped members 18 and 19 are disposed. The member 18 fits within the member 19, as indicated best in Figure 4. The member 19 rotates on a trunnion 20 which is threaded into an opening 21 in the member 15 and extends into an opening 22 formed at the axis of the cup-shaped member 19. The member 18 is carried by a trunnion 23 which is threaded into an opening 24 formed in the member 15 and extends into an opening 25 in the member 18 at the axis thereof. Thus, the cup-shaped members interfit with each other but are free to rotate relative to each other. The annular flanges 18a and 19a thereof are superimposed. The flange 18a is provided with openings 18b and 18c which are almost diametrically opposed. The flange 19a is provided with openings 19b and 19c which are almost diametrically opposed. The openings 18c and 19c and the openings 18b and 19b are adapted to be brought into alignment with each other at the proper times by relative rotation of the members 18 and 19. However, when the openings 18c and 19c are in alignment with each other (Figure 3) the openings 18b and 19b are out of alignment with each other and vice versa.

Figure 6:
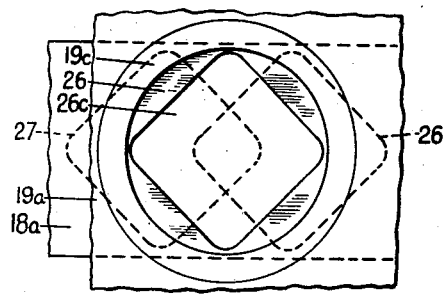
Figure 6 is a detail showing the shape of the openings in the cutting blades.
Figure 7:
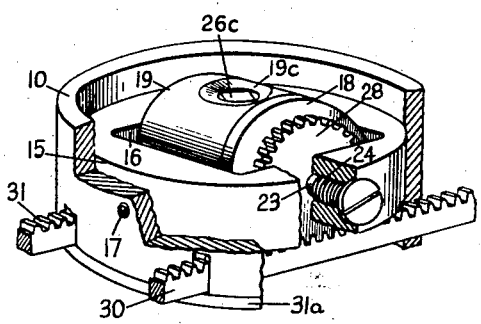
Figure 7 is a perspective view, partly broken away, of the shear structure.
Figure 8:
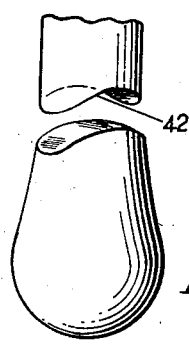
Figure 8 is a perspective view of a stream of glass having a gob sheared therefrom and illustrating the shape imparted to the lower end of the stream by the shears.

Recessed into the under surface of the flange 19a adjacent 19c is the shear blade 26. Recessed in the upper surface of the flange 18a adjacent the openings 18c is a shear blade 27. These blades have the same arc of curvature as the flanges 18a and 19a and are disposed in superimposed contacting relationship. The blade 26 is provided with an opening 26c in alignment with the opening 19c while the blade 27 has an opening 27c in alignment with the opening 18c. The shape of the openings 26c and 27c is illustrated best in Figure 6. These openings are substantially square but are so disposed that the edges of the openings are at approximately 45 degree angles relative to the path of movement of the blades. The edges of the openings 26c and 27c are formed into cutting edges. It will be noted that the openings 19c and 18c are of a diameter approximating the diagonal dimension of the openings 26c and 27c. The edge of the opening 19c is beveled as indicated at 19d while the edge of the opening 18c is beveled as indicated at 18d.

Figure 2:
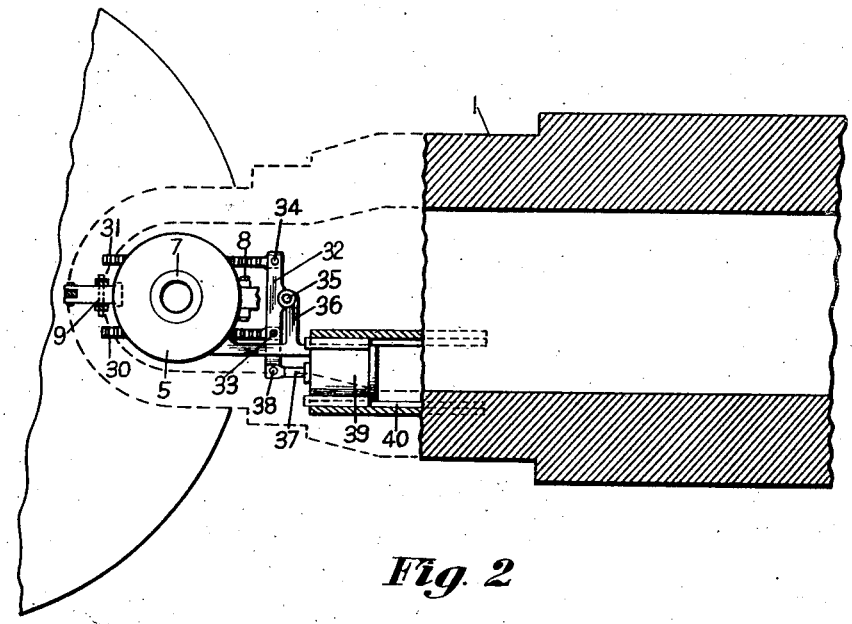
Figure 2 is a horizontal sectional view taken substantially along line 2—2 of Figure 1.

In order to rotate the members 18 and 19 relative to each other, I provide gear and rack mechanism. The member 18 has a gear portion 28 formed thereon while the member 19 has a gear portion 29 formed thereon. The portion 28 meshes with a rack 30 while the portion 29 meshes with a rack 31. These racks are parallel with each other and extend chordally relatively to the member 10. They are slidably mounted in suitable notches in the member 10. They rest on a ring 31a attached to the lower end of member 10. These racks have one of their ends pivotally connected to a link 32 (Figure 2) as at 33 and 34. The link 32 is provided intermediate its ends as at 35 to a stationary support 36. One end of the line 32 is pivotally connected to a piston rod 37 as at 38. The piston rod forms a part of a cylinder and piston unit 39 which is adjustably mounted on guides 40 attached to the lower side of the spout. Air lines 41a and 42a are connected to the unit 39 and suitable controls may be provided for moving the piston in opposite directions. It will be apparent that when the piston is moved in one direction so that the piston rod 37 moves outwardly, the link 32 will be pivoted around the point 35. This will cause the rack 30 to move to the left (Figure 2) and the rack 31 to move to the right. This, in turn, will rotate the member 18 in a clockwise direction and the member 19 in a counter-clockwise direction. Movement of the piston rod in the opposite direction will produce rotation of these members in reverse directions.

Figure 3:
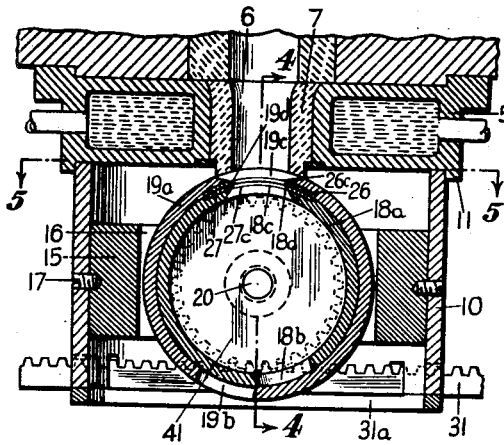
Figure 3 is a vertical sectional view taken through the shear structure.
Figure 4:
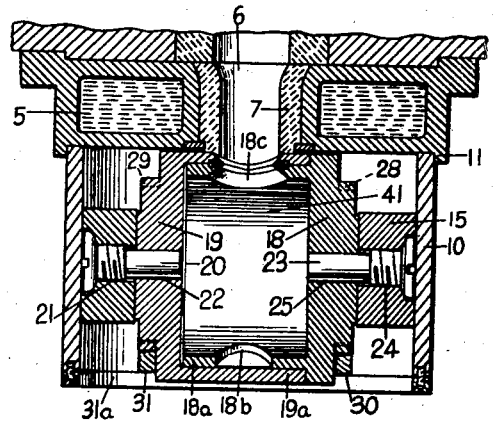
Figure 4 is a sectional view taken along line 4—4 of Figure 3.
Figure 5:
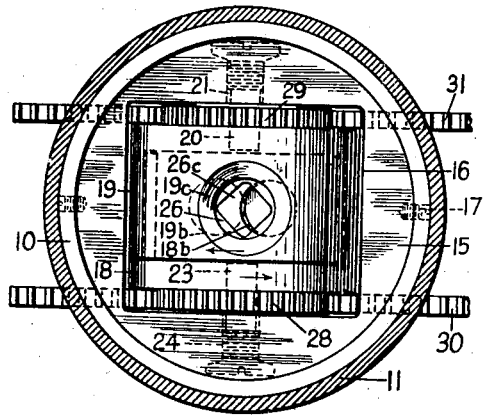
Figure 5 is a horizontal sectional view taken substantially along line 5—5 of Figure 3.
Figures 9, 10, 11:
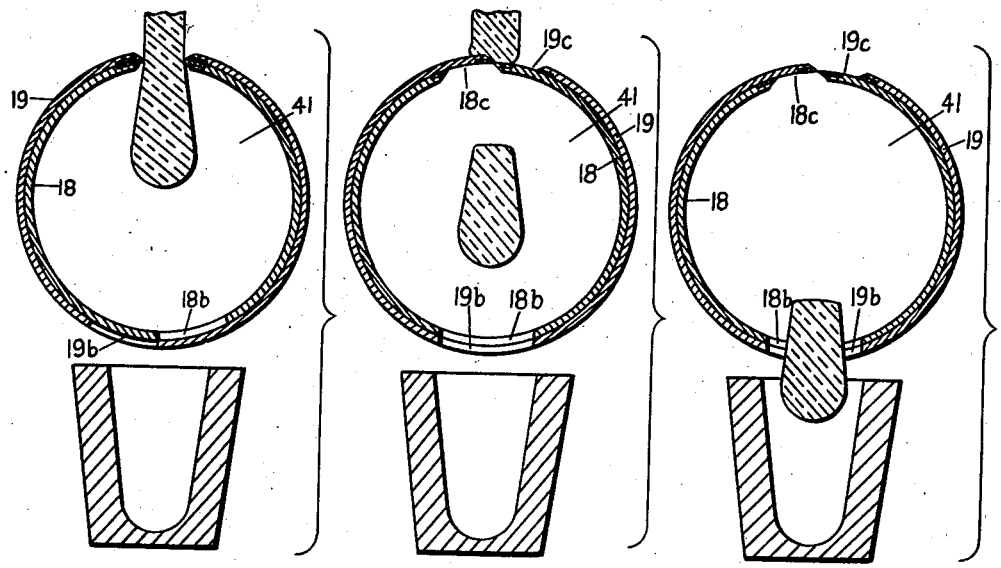
Figure 9 is a vertical sectional view, more or less diagrammatic, illustrating how the stream of molten glass flows into the shear structure.
Figure 10 is a similar view showing the shear structure as it appears just after shearing a charge from the stream.
Figure 11 is a similar view showing the charge dropping from the shear structure.

In the use of the shear structure, it will be disclosed below the outlet orifice and the members 18 and 19 will be in the relative positions indicated in Figure 3. That is, the openings 19c and 18c will be in alignment and the openings 26c and 27c in the shear blades will also be in alignment as indicated by the full lines in Figure 6. The openings 18b and 19b will be out of alignment so that the chamber 41 formed within members 18 and 19 will be closed and no air will be permitted to enter thereinto or up into the orifice of the spout to adversely affect the temperature of the glass. As indicated in Figure 9, the glass stream will flow down through the openings in the shear blades and members 18 and 19 into the chamber 41. At the proper time relative rotation of members 18 and 19 will be produced which, in turn, will produce relative rotation of the shear blades. The shear blades will move in the manner illustrated by the dotted lines in Figure 6 causing the opening between them to gradually become smaller and thereby shearing the glass. When the glass charge is sheared from the stream it will drop through the chamber 41, as indicated in Figure 10, and will pass through the aligning openings 18b and 19b as illustrated in Figure 11. Immediately after the charge passes from the chamber 41 into the mold, rotation of members 18 and 19 will be reversed again closing the lower end of the chamber 41 but establishing communication of such chamber with the spout orifice. With this shear structure it is possible to have a mold disposed directly adjacent the spout orifice and the glass charge will be protected from drafts or atmospheric conditions during its passage from the spout to the mold.

One of the most important features of my invention resides in the fact that with my shear structure, the glass is sheared in such a manner that the shear mark will be eliminated. This is due to the shape of the blades 26 and 27. These blades are curved as previously stated. In cutting the glass they produce a plano-cylinder curve 42 on the lower end of the stream of glass. In other words, as the blades move through the glass, they force upwardly the center portion of the glass, which is the last portion sheared, into the hotter portion of the glass at the center of the stream. Thus, the chilling effect of shears on the glass is overcome due to the fact that the chilled glass is forced up into the hot center of the stream.

It will be noted that the shear blades are of such shape that they act to the same extent on the opposite sides of the stream of glass and will consequently center the stream of glass.

Figure 12:
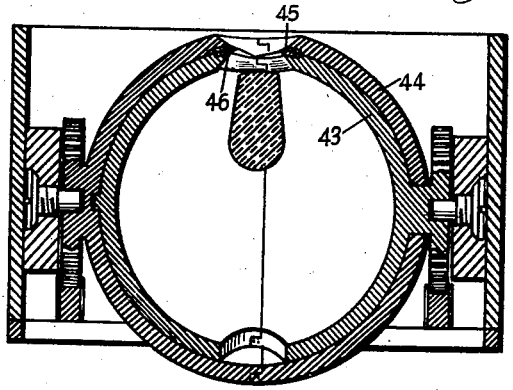
Figure 12 is a vertical sectional view illustrating a modification of my shear structure.
Figure 13:
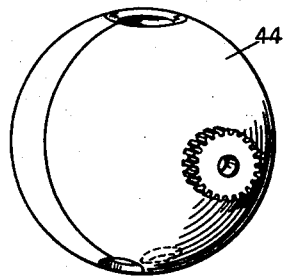
Figure 13 is a perspective view of the structure illustrated in Figure 12.
Figure 14:
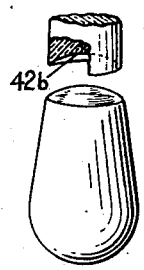
Figure 14 is a perspective view showing a gob or charge sheared from the stream of glass and illustrating the shape imparted to the lower end of the stream by the shear structure of Figure 12.

In Figures 12 and 13 I illustrate a modification of my shear structure. In this form the members 43 and 44 which are used instead of the members 18 and 19 are of spherical shape rather than cylindrical or cup-shaped. The blades 45 and 46 carried by these members are also of a spherical curvature. The members 43 and 44 will be rotated relative to each other in the same manner as the members 18 and 19. However, because of the spherical shape of the blades, a concave spherical depression 42b will be formed in the lower end of the stream of glass, as indicated in Figure 14.

Various other advantages will be apparent from the preceding description, the drawings and the following claims.

Having thus described my invention, what I claim is:

1. A shear structure for molten glass comprising an outer hollow member and an inner hollow member, shear blades associated with the different hollow members, and means for producing relative movement of said hollow members and relative movement of said shear blades, said hollow members having a set of openings adapted to be brought into alignment by the relative movement thereof to permit a stream of glass to flow thereinto and a set of openings disposed opposite the first set adapted to be brought into alignment by the relative movement thereof to permit the severed charge to pass out of said hollow members.

2. A shear structure for molten glass comprising an outer member of cylindrical form and an inner member of cylindrical form mounted for rotation about the axes, means for producing relative rotation of said members, said inner member and outer member being provided with a set of openings adapted to be brought into alignment by the relative rotation thereof to permit the glass to flow into the interior thereof, shear blades having the same curvature as the walls of said inner and outer members being carried by the inner and outer members and being provided with openings in alignment with said openings in said members, said openings in the shear blades being adapted to receive the stream of glass, rotation of said inner and outer members being adapted to move said shear blades relative to each other to shear the glass and to simultaneously move said openings in said inner and outer members out of alignment with each other, said inner and outer members being provided with another set of openings substantially diametrically opposed to the first openings for permitting the severed charge to pass therethrough, said last-named openings being out of alignment when the first-named openings are in alignment and vice versa.

3. A shear structure for molten glass comprising an outer member of spherical form and an inner member of spherical form, means for producing relative rotation of said members, said inner member and outer member being provided with a set of openings adapted to be brought into alignment by the relative rotation thereof to permit the glass to flow into the interior thereof, shear blades having the same curvature as the walls of said inner and outer members being carried by the inner and outer members and being provided with openings in alignment with said openings in said members, said openings in the shear blades being adapted to receive the stream of glass, rotation of said inner and outer members being adapted to move said shear blades relative to each other to shear the glass and to simultaneously move said openings in said inner and outer members out of alignment with each other, said inner and outer members being provided with another set of openings substantially diametrically opposed to the first openings for permitting the severed charge to pass therethrough, said last-named openings being out of alignment when the first-named openings are in alignment and vice versa.

4. A shear structure for molten glass comprising an outer member of cylindrical form and an inner member of cylindrical form mounted for rotation about their axes, said inner member and outer member being provided with a set of openings adapted to be brought into alignment by the relative rotation thereof to permit the glass to flow into the interior thereof, shear blades having the same curvature as the walls of said inner and outer members being carried by the inner and outer members and being provided with openings in alignment with said openings in said members, said openings in the shear blades being adapted to receive the stream of glass, rotation of said inner and outer members being adapted to move said shear blades relative to each other to shear the glass and to simultaneously move said openings in said inner and outer members out of alignment with each other, said inner and outer members being provided with another set of openings substantially diametrically opposed to the first openings for permitting the severed charge to pass therethrough, said last-named openings being out of alignment when the first-named openings are in alignment and vice versa, means for producing relative rotation of said members, said means comprising gear and rack mechanism for simultaneously rotating said members in opposite directions.

5. A shear structure for molten glass comprising an outer member of cylindrical form and an inner member of cylindrical form mounted for rotation about their axes, means for producing relative rotation of said members, said inner member and outer member being provided with a set of openings adapted to be brought into alignment by the relative rotation thereof to permit the glass to flow into the interior thereof, shear blades carried by the inner and outer members and being provided with openings in alignment with said openings in said members, said openings in the shear blades being adapted to receive the stream of glass, rotation of said inner and outer members being adapted to move said shear blades relative to each other to shear the glass and to simultaneously move said openings in said inner and outer members out of alignment with each other, said inner and outer members being provided with another set of openings substantially diametrically opposed to the first openings for permitting the severed charge to pass therethrough, said last-named openings being out of alignment when the first-named openings are in alignment and vice versa.

GEORGE T. MEYERS.